J A. HARTSFIELD.
Rotary Cultivator.
No. 29,166.
Patented July 17, 1860.
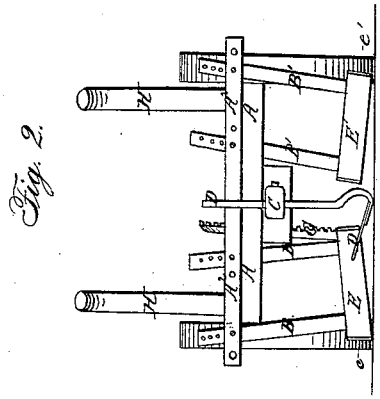
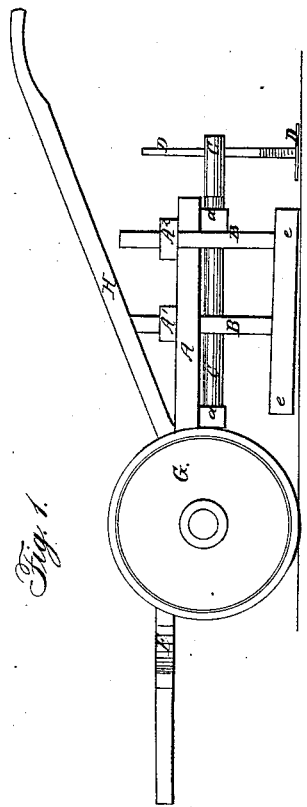
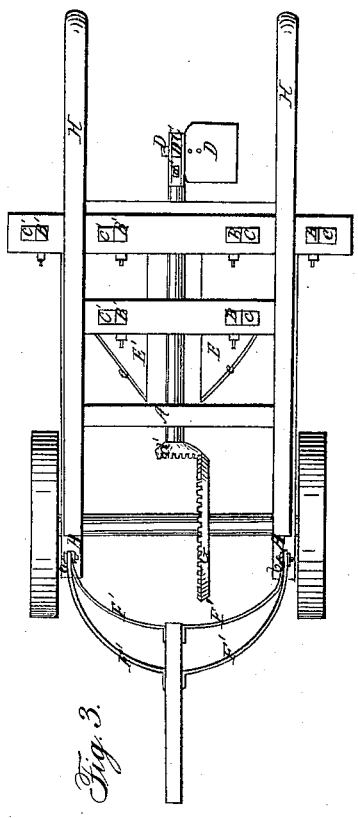
Witnesses:
Inventor:

UNITED STATES PATENT OFFICE.

JACOB A. HARTSFIELD, OF KINSTON, NORTH CAROLINA.

IMPROVEMENT IN COTTON-CULTIVATORS.

Specification forming part of Letters Patent No. 29,166, dated July 17, 1860.

*To all whom it may concern:*

Be it known that I, JACOB A. HARTSFIELD, of Kinston, in the county of Lenoir and State of North Carolina, have invented a new and Improved Cultivator; and I do hereby declare that the following is a full and exact description thereof, reference being had to the accompanying drawings, and to the letters of reference marked thereon.

Figure 1 is a side view leaving the driving-wheel off. Fig. 2 is a plan view. Fig. 3 is an end view.

The nature of my invention consists in the arrangement of devices hereinafter described.

To enable others skilled in the art to make and use my invention, I will proceed to describe its construction and operation.

In the construction, A is the main frame, which rests in front on the axle.

A' and A'' are cross-bars extending across the main frame, and into which are slots for the vertical posts B to move in, which posts are attached to the scrapers E and E'.

In Fig. 2, e is the metallic face on scrapers E and E'. G is the gear-wheel attached to the axle. C is the shaft, to which is attached the chopper, and which operates the same, and which shaft has its bearing at a. D is the chopper. F is the guide-pole. H is the handles.

In Figs. 2 and 3 same letters show like parts.

B in Fig. 2 is the vertical adjustable posts attached to E'.

In Fig. 3, c and c' are the slots in cross-bar A' and A''; d', slot in revolving shaft C, in which another chopper may be put when necessary. a' is a pinion gear-wheel on shaft C, which gears into main cog-wheel G. F' is the hounds, to which guide-pole F is attached, and which are hinged on frame A, and may be turned out of way for convenience. By means of slots c and c' and uprights B and B', I can raise or lower the scrapers E and E'; or I can set them closer together or farther apart as the growth of the crop or condition of the soil may require. The chopper D may also be lowered or raised by means of a thumb-screw in shaft C.

In the operation of my invention as the axle revolves by the forward motion of the machine the cog-wheel G, working in pinion a', gives a revolving motion to shaft C, which revolves and operates chopper D, which will at each revolution cut its width out of the row of cotton or rice, thus thinning the same as required. The machine is so arranged that scrapers E and E' will throw the earth from both sides at the same time, it being while the thinning process is going on by means of the chopper.

My machine is operated by two horses and one hand, and will do the work of two horses and five hands in the ordinary mode of cultivation.

Having thus described the nature of my invention, what I claim as new, and desire to secure by Letters Patent, is—

The arrangement of the main frame A, the cross-bars A' and A'', the scrapers E and E', the gear-wheel G, the shaft C, the chopper D, the guide-pole F, the handles H, the vertical posts B and B', the slots c and c', the slot d' in revolving shaft, the pinion gear-wheel a', and the hounds F', the whole being constructed and combined as hereinbefore described, for the purposes set forth.

JACOB A. HARTSFIELD.

Witnesses:
 EDWD. T. FICSTOE,
 J. PIGOTT.